(No Model.)

C. W. WILLIAMS.
COTTON CHOPPER.

No. 476,586. Patented June 7, 1892.

WITNESSES—
Geo. E. Frech.
Rob't H. Fitzgerald.

INVENTOR—
Charles W. Williams
per
Lehmann, Pattison & Nesbit
attys.

United States Patent Office.

CHARLES W. WILLIAMS, OF MONTGOMERY, LOUISIANA.

COTTON-CHOPPER.

SPECIFICATION forming part of Letters Patent No. 476,586, dated June 7, 1892.

Application filed January 25, 1892. Serial No. 419,212. (No model.)

*To all whom it may concern:*

Be it known that I, CHARLES W. WILLIAMS, of Montgomery, in the parish of Grant and State of Louisiana, have invented certain new and useful Improvements in Cotton-Choppers; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-choppers; and it consists in certain novel features of construction and in the combination and arrangement of parts, which will be fully described hereinafter, and more particularly referred to in the annexed claims.

The object of my invention is to provide an improved means for throwing the chopping mechanism in and out of gear, and also to provide the machine with laterally-adjustable cultivator-teeth.

Figure 1:
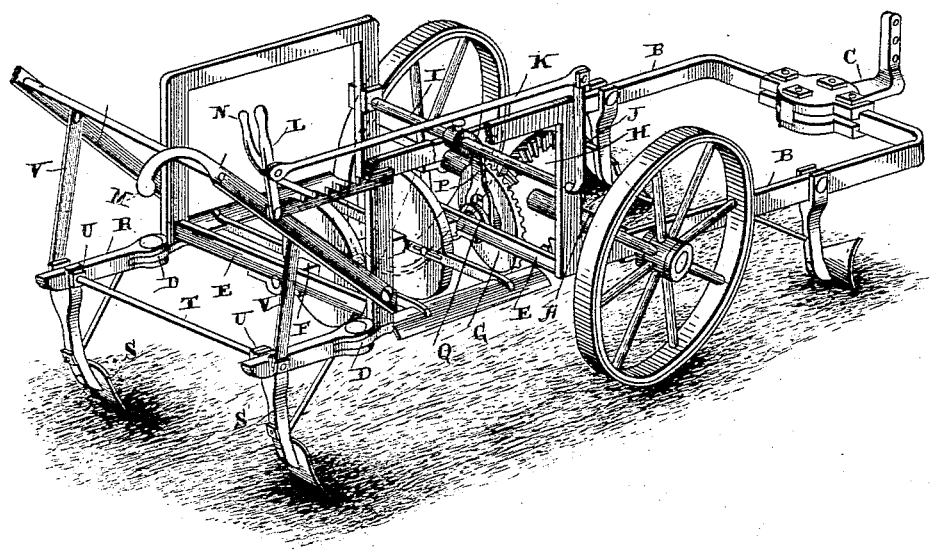
Figure 2:
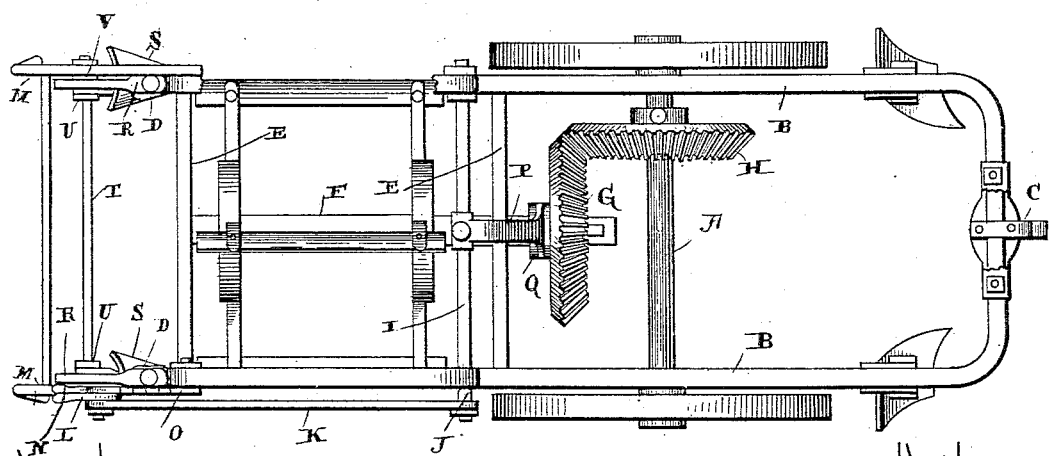

Referring to the accompanying drawings, Figure 1 is a perspective view of my improved machine. Fig. 2 is a plan view of the same.

A represents the main driving-shaft, which is journaled in arms B of the frame which are connected at their forward ends to form a support for a hitching device C. The rear portions of the arms B are arched, as shown, to make room for the chopping-knives while revolving, and formed on the lower rear ends of the said arms are the horizontal perforated projections D. The lower portions of the front and rear ends of the arch are connected by cross-pieces E, which form supports in which the knife-carrying shaft F is journaled. The front end of the said shaft is extended outward, and mounted thereon is the gear G. This gear is free to move longitudinally on the shaft, but is held from revolving thereon.

Mounted on the shaft A is the gear H, with which the wheel G engages when the chopper is being revolved.

Mounted loosely in the front end of the arch is the rock-shaft I, having one end turned up to form a crank, as shown at J. Connected to this crank is the rearwardly-extending rod K, which is connected to the pivoted operating-lever L, mounted on the handle M. Pivoted to the inner side of this lever is the dog M, which engages a horizontal rack O, and by this means the operating-lever is held in the desired adjustment.

P represents a downward and forwardly extending arm, which is secured to the shaft I. The lower end of this arm is loosely secured to a collar Q, extending rearward from the gear G, as shown. Thus it will be seen that when the shaft I is oscillated by the operating rod and lever the said gear-wheel will be thrown either into or out of engagement with the wheel H, as may be desired.

Pivotally secured to the projections D are the rearwardly-extending arms R, carrying shovels S. Connecting these arms is the screw-threaded rod T, upon which they are made laterally adjustable by the nuts U, as will be readily understood. The arms R are braced in their extended position by the depending bars V, which are secured at their upper ends to the handles M.

The lever L, being adjacent to the handle of the machine, is within easy reach of the operator without leaving his position behind the machine.

The chopping-knives are made adjustable on the shaft and can be extended outward as far as desired without coming in contact with the machine-frame in their revolution. Another advantage gained by having the frame formed with an arch, as shown, is that the machine may be constructed more compactly than if the sides of the frame were in a line with the chopper-carrying axle. In the latter construction it is necessary to form a very wide frame in order to accommodate the knives in their revolution.

Having thus described my invention, I claim—

1. In a cotton-chopper, the combination, with an axle and a frame mounted thereon having upwardly-arched sides, of cross-bars which connect the lower ends of the opposite arches, and a chopper-carrying shaft journaled in the said cross-bar and which revolves beneath the said arches, substantially as shown and described.

2. In a cotton-chopper, the combination of an axle, a gear-wheel, a frame supported on the axle having upwardly-arched sides, a chopper-shaft journaled between the arches, a longitudinally-moving gear-wheel on the end of said shaft which engages the gear on the axle, a rock-shaft journaled in the ends of the arches, an arm depending therefrom which engages the laterally-moving gear, and an operating-lever, substantially as shown and described.

3. In a cotton-chopper, the combination, with an axle, a gear-wheel thereon, a frame supported on the axle having upwardly-arched sides, a chopper-carrying shaft journaled between said arched sides, a movable gear on the shaft which engages the gear on the axle, a horizontal rock-shaft journaled in the arched frame, an arm depending therefrom which engages the said movable gear, a rod extending rearward from the crank end of the shaft, a handle projecting outward from the rear of the frame, a ratchet-bar connecting the said handle with the rear end of the arched frame, a lever pivoted to the handle and which is connected to the rear end of the said rod, and a dog carried by said lever which engages said ratchet-bar, substantially as shown and described.

In testimony whereof I affix my signature in presence of two witnesses.

CHARLES W. WILLIAMS.

Witnesses:
PERRY K. ABEL,
JAMES M. REED.